(12) United States Patent
Sridhar et al.

(10) Patent No.: US 6,900,931 B1
(45) Date of Patent: May 31, 2005

(54) THREE-STAGE OPTICAL AMPLIFIER HAVING FLAT SPECTRAL GAIN

(75) Inventors: Balakrishnan Sridhar, Ellicott City, MD (US); Clark Scrandis, Columbia, MD (US); James E. DeGrange, Jr., Glen Burnie, MD (US); Michael G. Taylor, Laurel, MD (US); Jun Bao, Ellicott City, MD (US)

(73) Assignee: CIENA Corporation, Linthicum, MD (US)

( * ) Notice: Subject to any disclaimer, the term of this patent is extended or adjusted under 35 U.S.C. 154(b) by 0 days.

(21) Appl. No.: 09/677,344

(22) Filed: Oct. 2, 2000

(51) Int. Cl.[7] ................................................ H01S 3/00
(52) U.S. Cl. .................................................... 359/337.1
(58) Field of Search .......................... 359/337.1, 337.4, 359/337.13, 337.2, 337.21, 337.22, 337.5, 341.41, 341.42

(56) References Cited

U.S. PATENT DOCUMENTS

| | | | | |
|---|---|---|---|---|
| 5,532,864 A | * | 7/1996 | Alexander et al. | 359/177 |
| 5,664,131 A | * | 9/1997 | Sugiya | 359/337.13 |
| 5,742,427 A | * | 4/1998 | Kakui et al. | 359/134 |
| 5,963,361 A | | 10/1999 | Taylor et al. | 359/337 |
| 5,995,275 A | * | 11/1999 | Sugaya | 359/160 |
| 6,049,413 A | | 4/2000 | Taylor et al. | 359/337 |
| 6,057,959 A | | 5/2000 | Taylor et al. | 359/341 |
| 6,061,171 A | | 5/2000 | Taylor et al. | 359/341 |
| 6,067,187 A | * | 5/2000 | Onaka et al. | 359/160 |
| 6,091,541 A | * | 7/2000 | Yoon | 359/124 |
| 6,108,123 A | * | 8/2000 | Kinoshita | 359/161 |
| 6,151,160 A | * | 11/2000 | Ma et al. | 359/124 |
| 6,172,803 B1 | * | 1/2001 | Masuda et al. | 359/334 |
| 6,198,572 B1 | * | 3/2001 | Sugaya et al. | 359/161 |
| 6,201,636 B1 | * | 3/2001 | Noda | 359/161 |
| 6,215,584 B1 | * | 4/2001 | Yang et al. | 359/341 |
| 6,307,670 B1 | * | 10/2001 | McNamara | 359/341.33 |
| 6,359,726 B1 | * | 3/2002 | Onaka et al. | 359/337.1 |
| 6,359,727 B1 | * | 3/2002 | Nakazato | 359/337.4 |
| 6,411,430 B1 | * | 6/2002 | Ogino et al. | 359/337.11 |
| 6,424,457 B1 | * | 7/2002 | Koonmen et al. | 359/337.1 |
| 6,433,925 B1 | * | 8/2002 | Sakano et al. | 359/341.43 |

FOREIGN PATENT DOCUMENTS

EP 0944188 9/1999 .......... H04B/10/17

OTHER PUBLICATIONS

Masuda et al. Elec. Letts. Mar. 19, 1998 vol. 37, No. 6.*
Inoue et al. IEEE Phot. Tech. Letts. vol. 3, No. 8, Aug. 1991.*
Yoshida et al. Elec. Letts. Sep. 28, 1995, vol. 3, No. 20.*
Becker et al. 'Erbium–Doped Fiber Amplifiers' Academic Press 1999.*

(Continued)

Primary Examiner—Thomas H. Tarcza
Assistant Examiner—Deandra M. Hughes
(74) Attorney, Agent, or Firm—Michael R. Cammarata

(57) ABSTRACT

A three stage optical amplifier is disclosed having a substantially flat gain profile. The amplifier includes a variable optical attenuator coupled between second and third stages of the amplifier and a dispersion compensating element. The attenuation of the optical attenuator is adjusted in accordance with the loss across dispersion compensating element and the optical power input to the amplifier to thereby obtain a substantially flattened gain profile. An offset value can also be used to refine the variable optical attenuator control and minimize nonflatness. The first and second stages are preferably pumped to provide high gain and a low noise figure and the third stage is preferably pumped to provide a high optical conversion efficiency. In an additional example, received optical powers associated with each of the channels in a WDM system are monitored and the attenuators within each amplifier in the system are controlled so that the received powers are substantially equal.

24 Claims, 10 Drawing Sheets

OTHER PUBLICATIONS

Kinoshita et al. "Wideband WDM Erbium–doped Optical Fiber Amplifiers for 10 Gb/s, 32–channel SMF Transmission Systems" Jul. 1999 Fujitsu Sci. Tech. J.,35,1, pp. 82–90.*

Becker et al., Erbium Doped Fiber Amplifiers, Academic Press, Mar. 8, 1999, Chapters 5 and 6.

* cited by examiner

THREE-STAGE OPTICAL AMPLIFIER HAVING FLAT SPECTRAL GAIN

BACKGROUND OF THE INVENTION

The present invention is directed toward optical amplifiers having a substantially flat spectral gain.

Wavelength division multiplexing (WDM) has been explored as an approach for increasing the capacity of existing fiber optic networks. In a WDM system, plural optical signal channels are carried over a single optical fiber with each channel being assigned a particular wavelength. Such systems typically include a plurality of receivers, each detecting a respective channel by effectively filtering out the remaining channels.

Optical channels in a WDM system are frequently transmitted over silica based optical fibers, which typically have relatively low loss at wavelengths within a range of 1525 nm to 1580 nm. WDM optical signal channels at wavelengths within this low loss "window" can be transmitted over distances of approximately 50 km without significant attenuation. For distances beyond 50 km, however, optical amplifiers are required to compensate for optical fiber loss.

Optical amplifiers have been developed which include an optical fiber doped with Erbium. The Erbium-doped fiber is "pumped" with light at a selected wavelength, e.g., 980 nm, to provide amplification or gain at wavelengths within the low loss window of the optical fiber. However, Erbium doped fiber amplifiers do not uniformly amplify light within the spectral region of 1525 to 1580 nm. For example, an optical channel at a wavelength of 1540 nm, for example, is typically amplified 4 dB more than an optical channel at a wavelength of 1555 nm.

While such a large variation in gain can be tolerated for a system with only one optical amplifier, it cannot be tolerated for a system with plural optical amplifiers or numerous, narrowly-spaced optical channels. In these environments, much of the pump power supplies energy for amplifying light at the high gain wavelengths rather than amplifying the low gain wavelengths. As a result, low gain wavelengths suffer excessive noise accumulation after propagating through several amplifiers.

Accordingly, optical amplifiers providing substantially uniform spectral gain have been developed. In particular, two stage optical amplifiers including an optical filter provided between first and second stages of Erbium doped fiber are known to provide gain flatness. In these amplifiers, the first stage is operated in a high gain mode and supplies a low noise figure to the second stage, while the second stage is operated in a high power mode. Although the second stage introduces more noise than the first, the overall noise output by the amplifier is low due to the low noise figure of the first stage. The optical filter selectively attenuates the high gain wavelengths, while passing the low gain wavelengths, so that the gain is substantially equal for wavelength output from the second stage.

Various improvements to such conventional amplifiers were patented by the assignee of the present invention. Particularly, U.S. Pat. Nos. 6,057,959; 5,963,361; 6,049,413; and 6,061,171 disclose and claim various gain-flattened optical amplifiers. These disclosed amplifiers utilize two-stage amplification in which two stages of Erbium-doped fiber are pumped and in which an inter-stage variable optical attenuator is controlled. Various types of variable optical attenuator control are disclosed including adjusting the attenuation according to the gain of the first and second stages or the ASE (amplified spontaneous emission) of the first and second stages.

Although these previously patented amplifiers provide excellent gain flatness and a low noise figure there is still room for improvement.

As noticed by the inventors, these two stage, gain-flattening amplifiers are typically designed to receive optical signals at a particular power level. Specifically, a flat gain response may be achieved when the average population inversion of Erbium ions is at a particular level. This corresponds to a fixed input power level (for a particular set of pump power levels). When the input power level varies from this optimal input power level, the gain flatness suffers.

In other words, when the total power level of all optical signals input to the amplifier differs from the desired input level, the amplifier can no longer amplify each wavelength with substantially the same amount of gain. Accordingly, the conventional gain-flattened amplifiers discussed above are unable to receive input optical signals over a wide range of power levels while maintaining substantially uniform gain at each wavelength.

SUMMARY OF THE INVENTION

Consistent with an embodiment of the present invention, an optical amplification device is provided, including a first segment of active optical fiber having a first end portion coupled to an optical communication path carrying a plurality of optical signals, each at a respective one of a plurality of wavelengths, and a second end portion. The first segment of active optical fiber receives the plurality of optical signals through the first end portion and outputs the plurality of optical signals through said second end portion.

Furthermore, a dispersion compensating element is coupled to the second end portion of the first segment of active optical fiber.

In addition, the optical amplification device further includes a second segment of active optical fiber having a first end portion coupled to the output of the dispersion compensating element. The plurality of dispersion compensated optical signals are supplied to the first end portion of the second segment of active optical fiber via the output port of the dispersion compensating element. The plurality of optical signals are next output from the second segment of active optical fiber via the second end portion of the second segment of active optical fiber.

A variable optical attenuator is also provided having an input port receiving the plurality of optical signals coupled to the second end portion of the second segment of active optical fiber. The variable optical attenuator further includes a control port that receives an attenuation control signal, and an output port.

In addition, the optical amplification device includes a third segment of active optical fiber having a first end portion coupled to the output port of the variable optical attenuator and a second end portion. The plurality of dispersion compensated optical signals propagate through the variable optical attenuator and are supplied to the first end portion of the third segment of active optical fiber via the output port of the variable optical attenuator. The plurality of optical signals are next output from the third segment of active optical fiber via the second end portion of the third segment of active optical fiber.

A control circuit is further provided which is optically coupled to the optical communication path. The control circuit senses variations in the input power applied to the amplification device and the power loss across the variable optical attenuator and outputs the attenuation control signal in response to the sensed input power and loss across the variable optical attenuator. The optical attenuator, in turn, attenuates the plurality of optical signals in response to the attenuation control signal in order to achieve a flattened gain profile.

In accordance with an additional embodiment of the present invention, the attenuation of the optical attenuator is controlled in accordance with the span loss error indicative of a change in the loss associated with a previous span to which the amplification device is connected and in accordance with a dispersion compensating element loss error indicative of a change in the expected loss across the dispersion compensating element.

In a further embodiment of the present invention, the attenuation of the optical attenuator is controlled in accordance with an additional factor. The additional factor is an offset value that accounts for any residual non-flatness in the amplification device.

Moreover, in accordance with an additional embodiment of the present invention, received power of each of a plurality of WDM signals is measured after propagation through a chain of amplifiers, each of which includes one of the three stage amplifier embodiments of the invention which include a dispersion compensating element between the first and second stages and a variable optical attenuator coupled between the second and third stages. Based on the received power, the attenuation of the optical attenuator in each amplifier is adjusted so that the received power associated with each WDM signal is substantially the same.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

Figure 1:
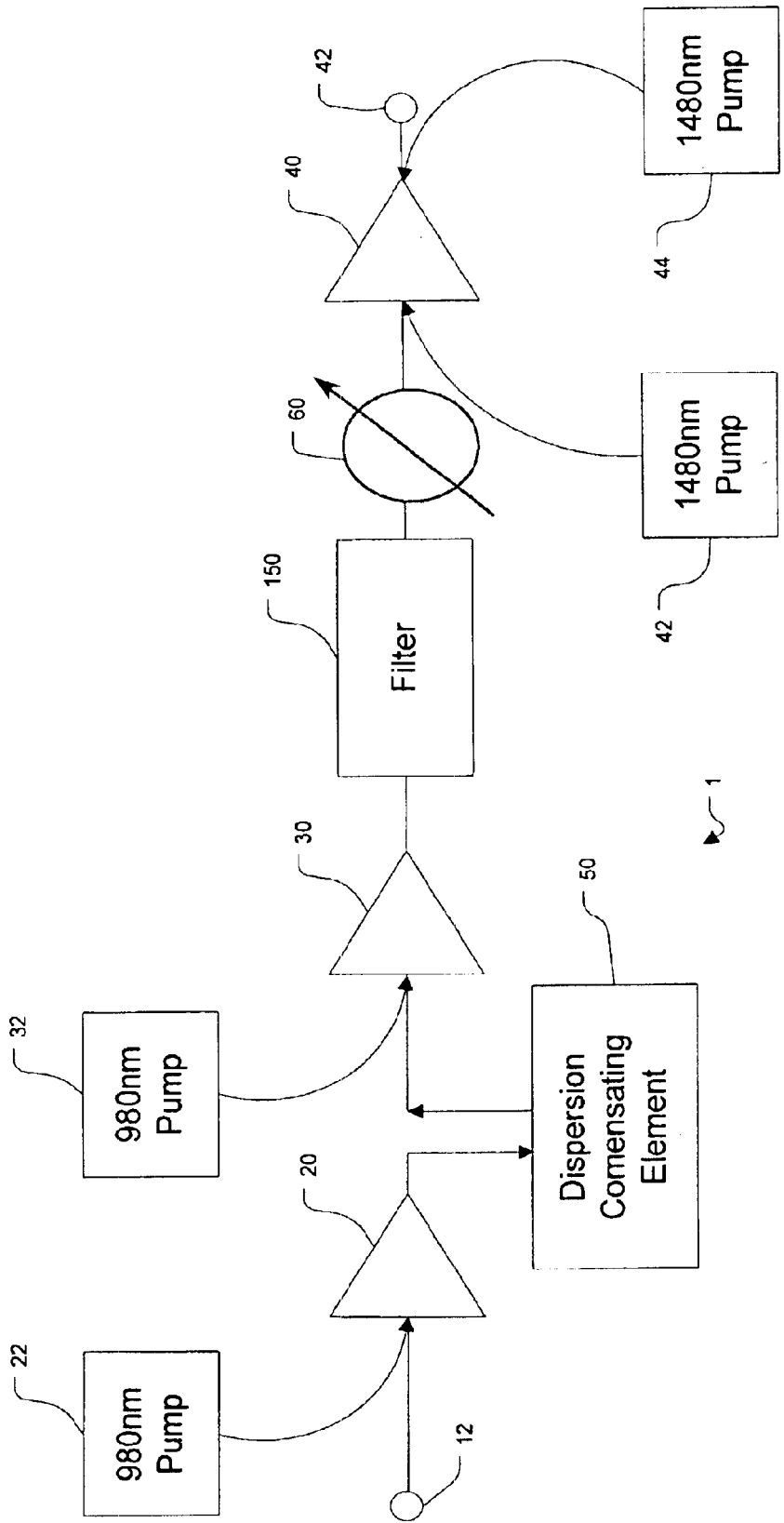
FIG. 1 illustrates an optical amplifier in accordance with a first embodiment of the present invention.

Turning to the drawings in which like reference characters indicate the same or similar elements in each of the several views, FIG. 1 illustrates an optical amplifier 1 in accordance with a first embodiment of the present invention. Optical amplifier 1 generally includes the components between input port 12 and output port 42.

Optical amplifier 1 is a three stage amplifier including a first amplifier stage 20, second amplifier stage 30 and third amplifier stage 40.

Each of the stages 20, 30, 40 of optical amplifier 1 includes a section of active optical fiber that is typically doped with a fluorescent material, such as Erbium, and pumped with light at a wavelength different than the amplified optical signals, e.g., 980 nm and/or 1480 nm as is known in the art. Pump lasers are coupled to the active optical fiber in each stage 20, 30, 40 excite the fluorescent material. The pump light is of sufficient magnitude and the composition of active optical fiber is such that the optical signals output from each stage are amplified.

Preferably and as shown in FIG. 1, the first stage amp 20 and second stage amp 30 are each pumped by a high power 980 nm pump (22 and 32, respectively) and the third stage is pumped by two high power 1480 nm pumps 42, 44. Pump 42 operates in a copropagating mode and pump 44 operates in a counterpropagating mode.

Although a variety of pump configurations may be utilized and FIG. 1 only shows one such configuration, it is preferred that the first and second stage amps 20, 30 are highly inverted and provide high gain and low noise figure with respect to the third stage amp 40. The output stage (third stage amp 40) is a power amplifier with the 1480 nm pumps providing high optical conversion efficiency with respect to the first and second stage amps 20, 30.

As further shown in FIG. 1, a filter 150 and variable optical attenuator 60 are preferably located between the second amp stage 30 and the third amp stage 40 so that the effect on the noise figure and output power of the amplifier 5 is minimized. Filter 150 may be a gain flattening filter or used to drop/add service channels (see FIGS. 6–9 and accompanying description below)

FIG. 1 shows a preferred pump arrangement and configuration of the three stage amp 1 relative to the filter 150 and variable optical attenuator 60.

Figure 2:
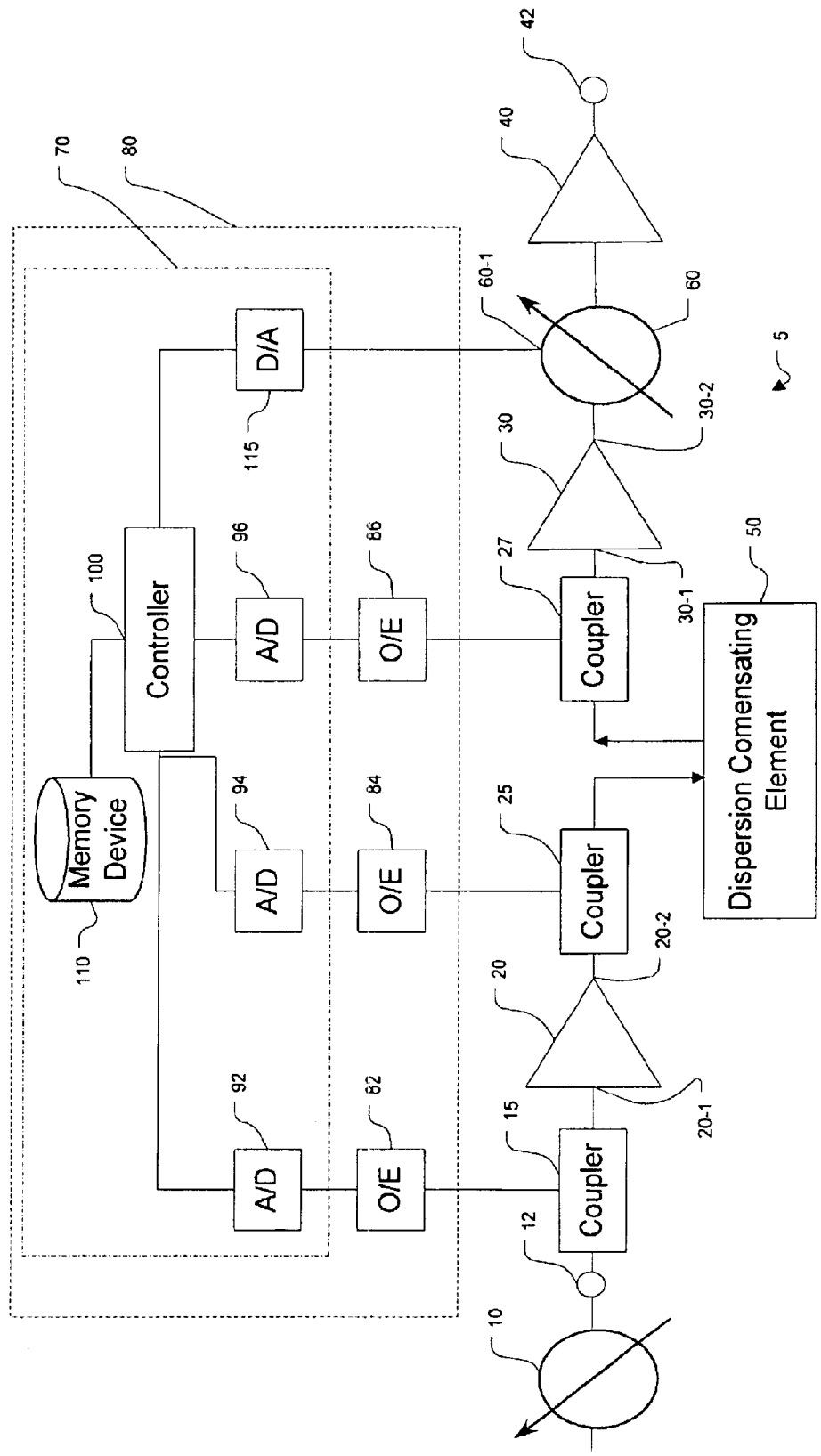
FIG. 2 illustrates an optical amplifier in accordance with a second embodiment of the present invention.

FIG. 2 further illustrates a control arrangement for the optical amplifier 5 and assumes that a pumping arrangement such as the one shown in FIG. 1 would be utilized to pump the three stages 20, 30, 40 of the amplifier 5. Optical amplifier 5 generally includes the components between input port 12 and output port 42.

As shown in FIG. 2, the input port 12 of optical amplifier 5 is connected to a span 10 the loss of which may vary. The symbol used to represent span 10 is similar to the one used to represent a variable optical attenuator and is intended to indicate the possibility that the loss of span 10 may vary. As mentioned above, a variation in span 10 loss will typically change the signal power input to amplifier 5 which would negatively affect the gain flatness unless corrective action were taken such as the actions taken by the invention as further described below.

In order to measure the input power variation, the amplifier 5 includes a known coupler 15 connected to input port 12 that receives a plurality of optical signals, each at a respective one of wavelengths $\lambda_1$ to $\lambda_n$ typically within a range of 1500 to 1590 nm. The plurality of optical signals may constitute WDM (wavelength division multiplexed) signals.

Coupler 15, like couplers 25 and 27, may be constructed with a conventional optical tap or splitter, which supplies each of the plurality of optical signals to both the input 20-1 of the first amp stage 20 and to O/E (optical-to-electrical converter) 82. The power of optical signals supplied to input 20-1 of the first amp stage 20 is typically significantly more than the power of optical signals supplied to the O/E 82. For example, the power supplied to O/E 82 may be approximately 2% of the power fed to input 20-1 (neglecting coupler loss, for simplicity).

The optical signals output from coupler 15 are supplied to a first amp stage 20, which provides a first stage of amplification.

After the first stage of amplification, the optical signals are next supplied to coupler 25. Coupler 25 may constructed with a conventional tap or splitter in the same fashion as coupler 25. Coupler 25 supplies a small portion of the light to O/E 84 with the majority being sent to dispersion compensating element 50. The output of dispersion compensating element 50 is fed to yet another coupler 27 which, in turn, feed a small portion to O/E 86 and the majority to the input 30-1 of the second stage amp 30.

In other words, couplers 25 and 27 respectively tap the input and output of dispersion compensating element 50 so that a dispersion power loss value may be measured as further described below.

Ignoring the couplers 25 and 27 for a moment, the dispersion compensating element 50 is provided between output port 20-2 of the first amp stage 20 and the input port 30-1 of the second amp stage 30. Dispersion compensating element 50 provides dispersion compensation for the optical signals output from the first amp stage 20, and can include a variety of elements such as a segment of known dispersion compensating fiber (DCF) or a dispersion compensating Bragg grating or both. It is noted that dispersion compensating element 50 may also be provided at any appropriate location within any one of the embodiments of the present invention.

Following dispersion compensating element 50 and coupler 27, the optical signals are next supplied to input port 30-1 of the second stage amplifier 30 which provides a second stage of amplification. The second stage amp 30 may be pumped as shown in FIG. 1 or with another pumping arrangement keeping in mind that the second stage amp 30 is preferably pumped such that the Erbium ions are highly inverted and to provide high gain and low noise figure to a signal passing therethrough.

The output of the second stage amp 30 is provided to a variable optical attenuator 60. Variable optical attenuator 60 has an attenuation which can be variably controlled in accordance with an attenuation control signal supplied to control port 60-1. Variable optical attenuator 60 may be constructed from known devices such as the commercially available variable optical attenuators from JDS Fitel and E-Tek, for example, that attenuate each of the optical signals by substantially the same amount, and as discussed in greater detail, controllably attenuates the optical signals so that amplifier 5 provides substantially flat gain profile for the optical signals.

The output of variable optical attenuator 60 is then supplied to the third stage amp 40 and then to the output port 42 of the optical amplifier 5. As mentioned above, the output stage (third stage amp 40) is preferably a power amplifier pumped so as to provide high optical conversion efficiency.

As further shown in FIG. 2, optical signals output from couplers 15, 25, and 27 are supplied to a control circuit 80 including conventional O/E converters 82, 84, and 86 (e.g. photodetectors), which respectively convert the optical signals to electrical signals. The electrical signals are respectively supplied to an attenuator adjustment circuit 70 which includes known analog-to-digital (A/D) converter circuits 92, 94 and 96 which convert the received electrical signals, typically in analog form, to digital signals.

The attenuator adjustment circuit 70 also includes controller 100, memory device 110 and digital-to-analog (D/A) converter 115. Other circuitry may be provided between photodetectors 82, 84, 86 and controller 100, as necessary, for example, interface circuits and voltage level adjustment circuits. Moreover, the A/D converters 92, 94, 96 may be eliminated entirely if the controller 100 and memory device are implemented with analog components.

Although controller 100 of FIG. 2 could be implemented as an analog device, the second embodiment shown in FIG. 2 is preferably implemented with a digital controller 100. Specifically, controller 100 may be implemented with a conventional microprocessor, central processing unit (CPU) or application specific integrated circuit (ASIC), which receives the electrical signals output from A/D converters 92, 94, and 96 and calculates an appropriate attenuator adjustment value that improves the amplifier 5 gain flatness in response thereto. Controller 100 further outputs an attenuation control signal in accordance with the attenuator adjustment value so that amplifier 5 maintains a substantially flat gain profile.

Controller 100 preferably calculates the attenuator adjustment value according to the input power level and the dispersion compensating element power loss. The coupler 15 and O/E 82 provide a mechanism that measures the amount of input power to amplifier 5. Likewise, couplers 25, 27 and their associated O/E converters 84, 86 provide a mechanism that measures the loss across the dispersion compensating element 50. Controller 100 may find the sum of the input power level value and the dispersion compensating element power loss value to determine the attenuator adjustment value.

The attenuator adjustment value is supplied by controller 100 to digital-to-analog converter circuit 115, which, in turn, feeds an attenuation control signal to control port 60-1 of variable optical attenuator 60, to appropriately adjust the attenuation thereof. Other circuitry may be provided between controller 100 and attenuator 108, as necessary, e.g, for voltage level adjustment, etc.

Thus, variations in input power applied to the first stage amp 20 as well as the loss across dispersion compensating element 50 can be offset by corresponding changes in the attenuation of variable optical attenuator 50 so that optical amplifier 5 maintains a substantially flat gain profile.

The memory device 110 may aid in the calculations performed by controller 100. For example, the dispersion compensating element loss value may not change very much over time. In that case, the mechanism for measuring the dispersion compensating element loss (couplers 25, 27; O/E 84, 86; and A/D 94, 96) may measure this loss value upon installation of the dispersion compensating element 50 and the controller 100 may store this loss value in memory device 110 for future reference. Preferably, however, this loss value is measured at least on a periodic basis.

Figure 3:
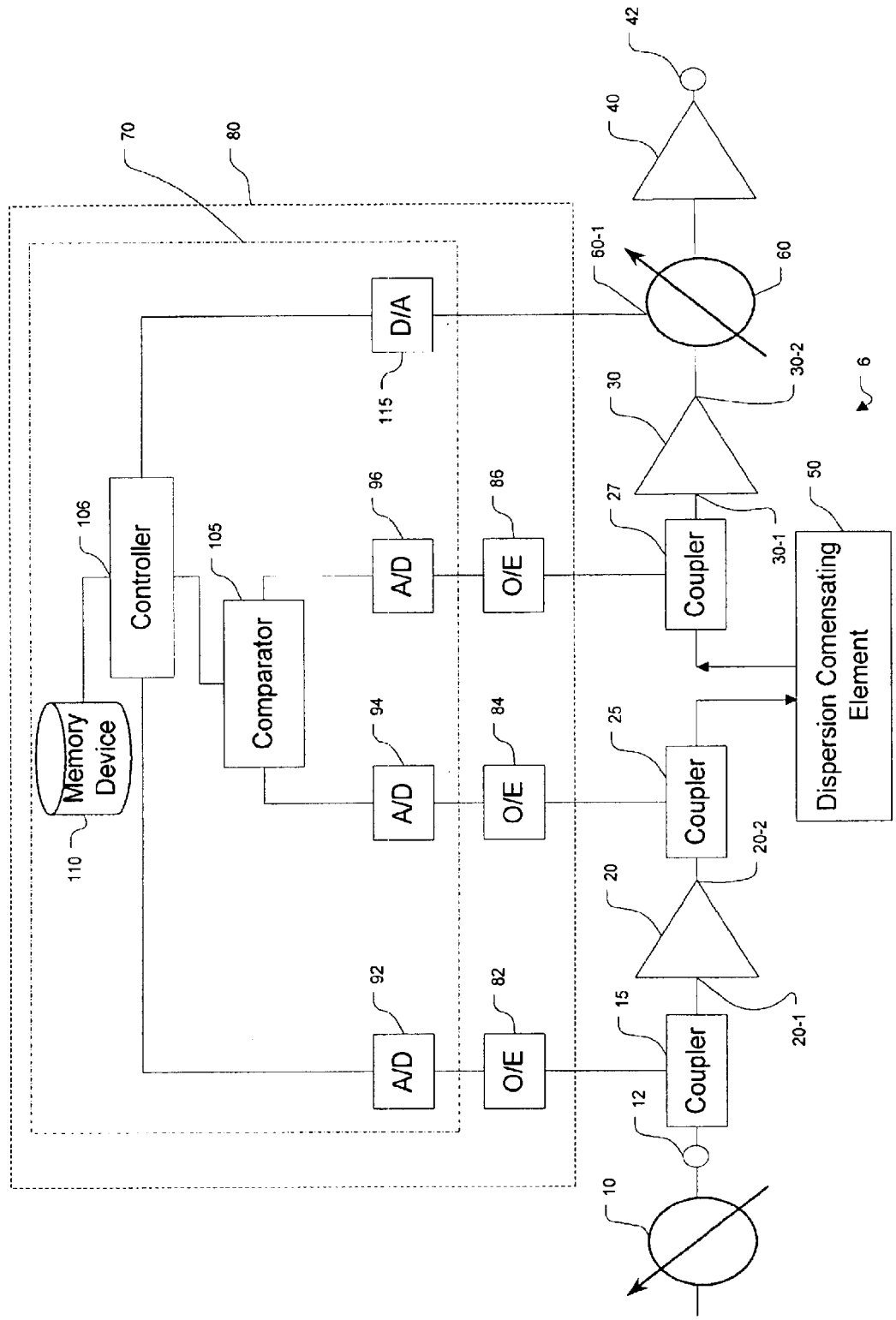
FIG. 3 illustrates an optical amplifier in accordance with a third embodiment of the present invention.

FIG. 3 illustrates optical amplifier 6 in accordance with an alternative embodiment of the present invention. Optical amplifier 6 is similar to optical amplifier 5 but attenuator adjustment circuit 70 further includes a comparator circuit 105. Comparator circuit 105 is connected to the A/D converters 94, 96 as shown in FIG. 3 and compares the input power to the output power of dispersion compensating element 50. In other words, comparator 105 determines the dispersion compensating element loss value and supplies this value to controller 106.

Controller 106 of FIG. 3 is similar to controller 100 of FIG. 2 but need not perform the calculation of the dispersion compensating element loss value. Instead, controller 106 inputs this loss value directly from comparator 105 and thereby simplifies the calculation of the attenuator adjustment value. In this way, a simpler device may be utilized to construct controller 106 as compared with controller 100. Comparator 105 may be constructed from a variety of devices such as a conventional subtracter. Once found, the dispersion compensating element loss value may be stored in memory device 115 for future reference as in the first embodiment.

Furthermore, the calculations performed by controllers 100 and 106 may be based on error values instead of absolute measurement values. More specifically, controllers 100 and 106 may calculate a span loss error value which is the difference between the expected (or previously determined) span loss value and the current span loss value 10. Likewise, controllers 100 and 106 may calculate a dispersion compensating element loss error value which is the difference between the expected (or previously determined) DCE 50 loss value and the current DCE 50 loss value. The expected (or previously determined) reference values may be stored in memory device 110 to enable such calculations.

Figure 4:
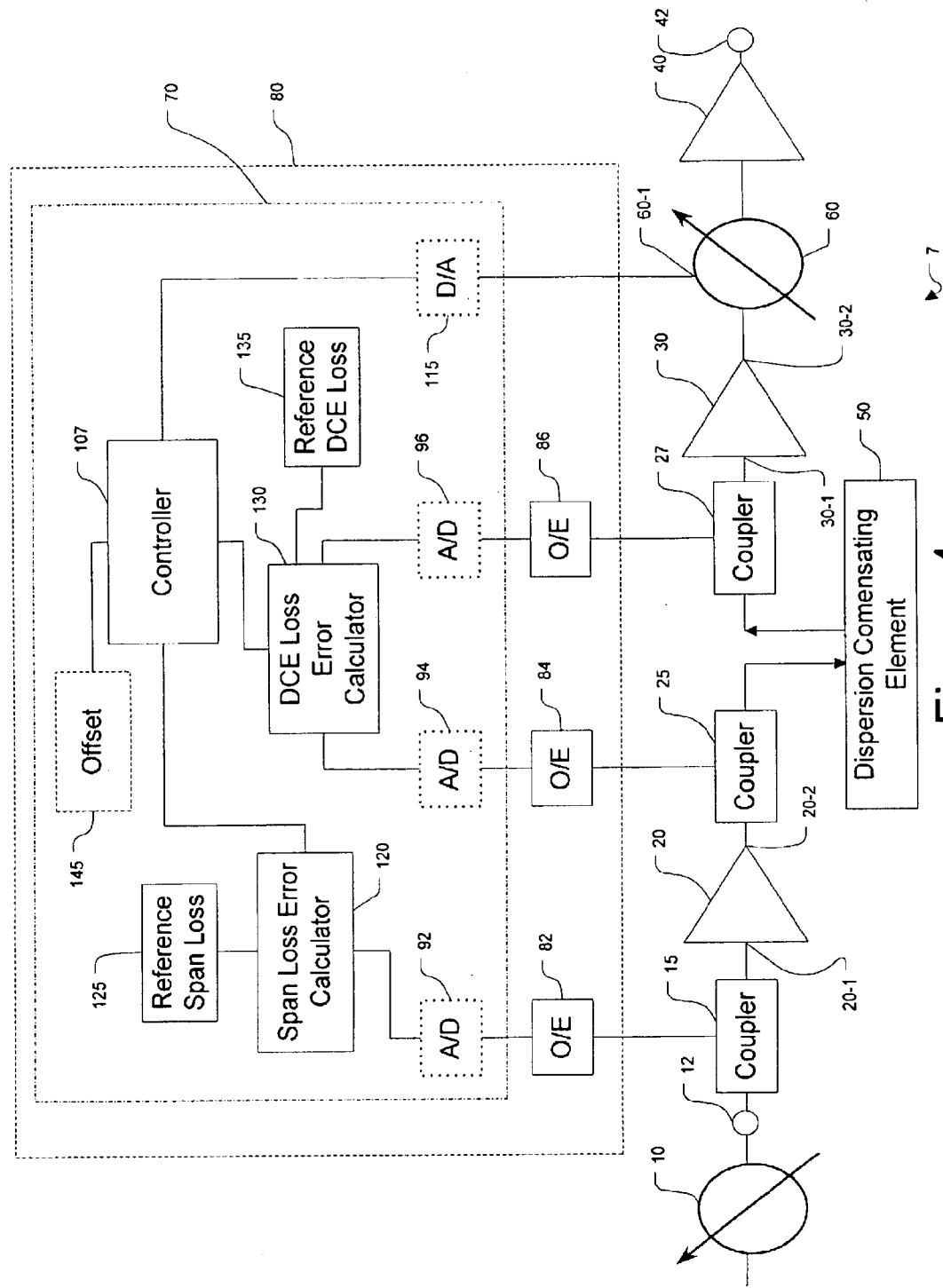
FIG. 4 illustrates an optical amplifier in accordance with a fourth embodiment of the present invention.

FIG. 4 illustrates optical amplifier 7 in accordance with another alternative embodiment of the present invention. Optical amplifier 7 is similar to optical amplifier 5 but attenuator adjustment circuit 70 includes alternative components. Namely, the attenuator adjustment circuit 70 includes a span loss error calculator connected to A/D 92 and to a reference span loss 125. Attenuator adjustment circuit 70 also includes a DCE loss error calculator connected to A/D 94, A/D 96 and to a reference DCE loss 135.

The reference span loss 125 and reference DCE loss 135 may be constructed with, for example, a memory device, a register, or a voltage reference. In some applications, the reference losses 125, 135 are known values that can be built into the optical amplifier by programming memory device(s) or registers with these values or with predetermined electrical signal sources (e.g. voltage references). The actual and reference loss values are respectively input to the span loss error calculator 120 and DCE loss error calculator 135 which output the span loss error and DCE loss error to controller 107 which utilizes the loss errors to calculate the attenuator adjustment value.

FIG. 4 also illustrates another alternative of the invention: an offset 145 may be used to improve the calculation of the attenuator adjustment value. Offset 145 may be constructed with, for example, a memory device, a register, or a voltage reference. The offset 145 may be utilized to compensate for the inherent or residual non-flatness of the amplifier 7. Specifically, many amplifiers of the invention (1,5,6,7,8,9,9') have a residual or inherent non-flatness depending upon a number of factors such as the variation in the length of Erbium-doped fiber in each of the amp stages 20, 30, 40; variation in gain-flattening filters (discussed below); and variations in other optical components.

During an optional but preferred calibration process, the optical amplifier 7 (or any of the optical amplifiers 5, 6, 8, or 9 disclosed herein) is fed with a comb of input signals spanning the expected range of wavelengths to be amplified (or with a white light source). The optical attenuator 60 is adjusted (either manually or automatically by controller 107) until the non-flatness of the output spectrum is at a minimum. This adjusted value is deemed an attenuator offset level and may be stored in memory device 110 or in offset 145 as, for example, a voltage reference.

If the offset is used, then controller 107 calculates the attenuator offset value as a function of the span loss error, DCE loss error, and the attenuator offset value. For example, the attenuator offset value may be the sum of the span loss error, DCE loss error and the attenuator offset value.

As indicated by the broken lines of the A/D and D/A converters 92, 94, 96 and 115; the embodiment of FIG. 4 is particularly well-suited to implementation with analog circuitry. For the example, an analog subtractor can be used to implement span loss error calculator 120 and the DCE loss error calculator 130 and a voltage reference can be used to implement reference span loss 125 and reference DCE loss 135. The controller 107 may be a simple summing circuit the analog output of which could be directly applied to the variable optical attenuator 60. Of course, voltage level correction may be utilized to correct the analog voltage level applied by controller 107 to the variable optical attenuator 60.

Figure 5:
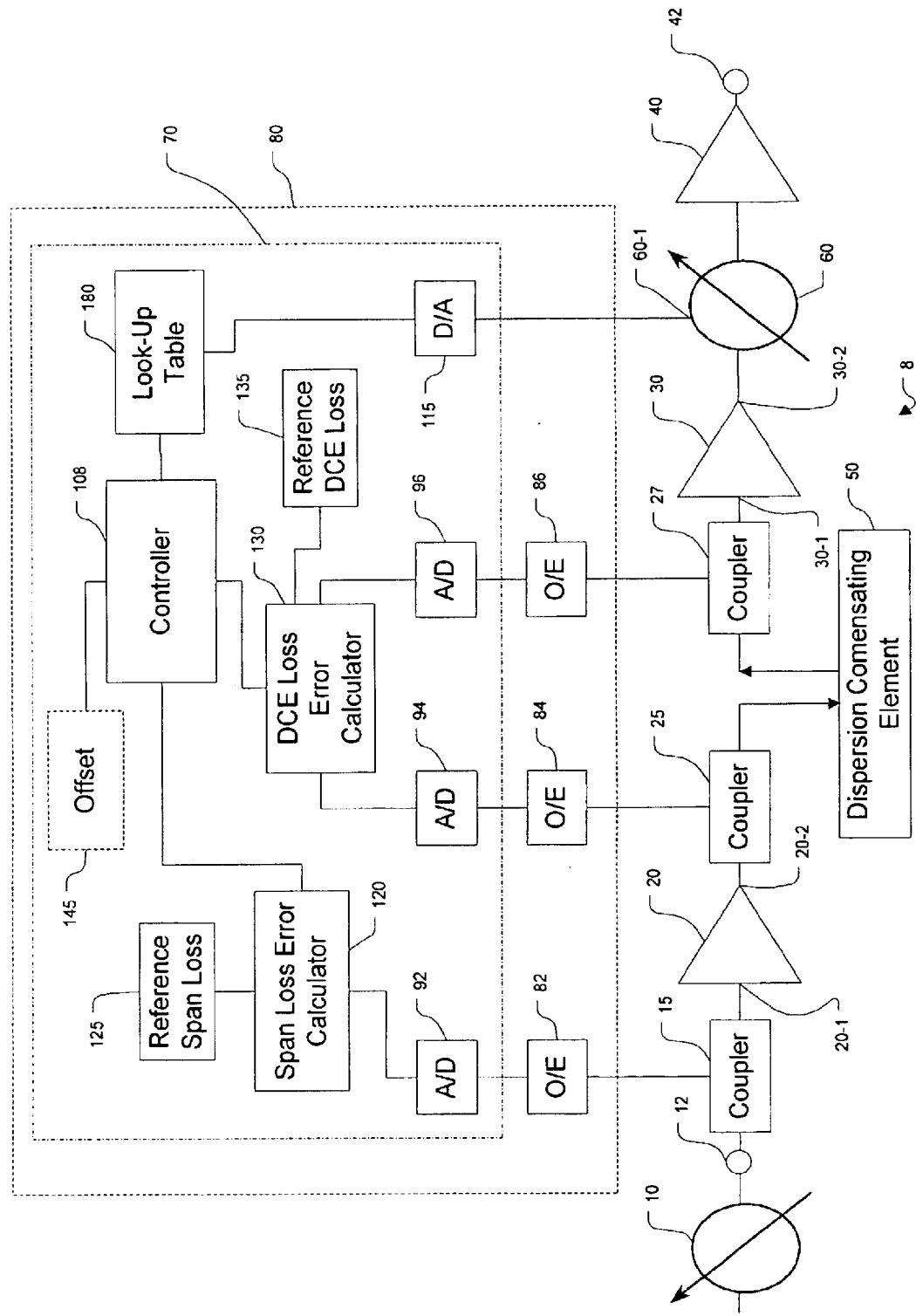
FIG. 5 illustrates an optical amplifier in accordance with a fifth embodiment of the present invention.

FIG. 5 illustrates optical amplifier 8 in accordance with another alternative embodiment of the present invention. Optical amplifier 8 of FIG. 5 is similar to optical amplifier 7 of FIG. 4 but attenuator adjustment circuit 70 includes alternative components. Namely, the attenuator adjustment circuit 70 includes a look-up table 180 and controller 108 may be simplified with respect to controller 107 of FIG. 4.

More specifically, the attenuator adjustment circuit 70 of FIG. 5 may utilize a look-up table 180 that which stores loss error values, as represented by the digital signal, and corresponding attenuator adjustment values. Accordingly, in response to the output from controller 108, look-up table 180 outputs an associated attenuator adjustment value corresponding to a substantially flat amplifier gain spectrum. Controller 108 need only sum the span loss error value, DCE loss error value and offset and apply the sum to the look-up table 180 in order to find the corresponding attenuator adjustment value.

Figure 6:
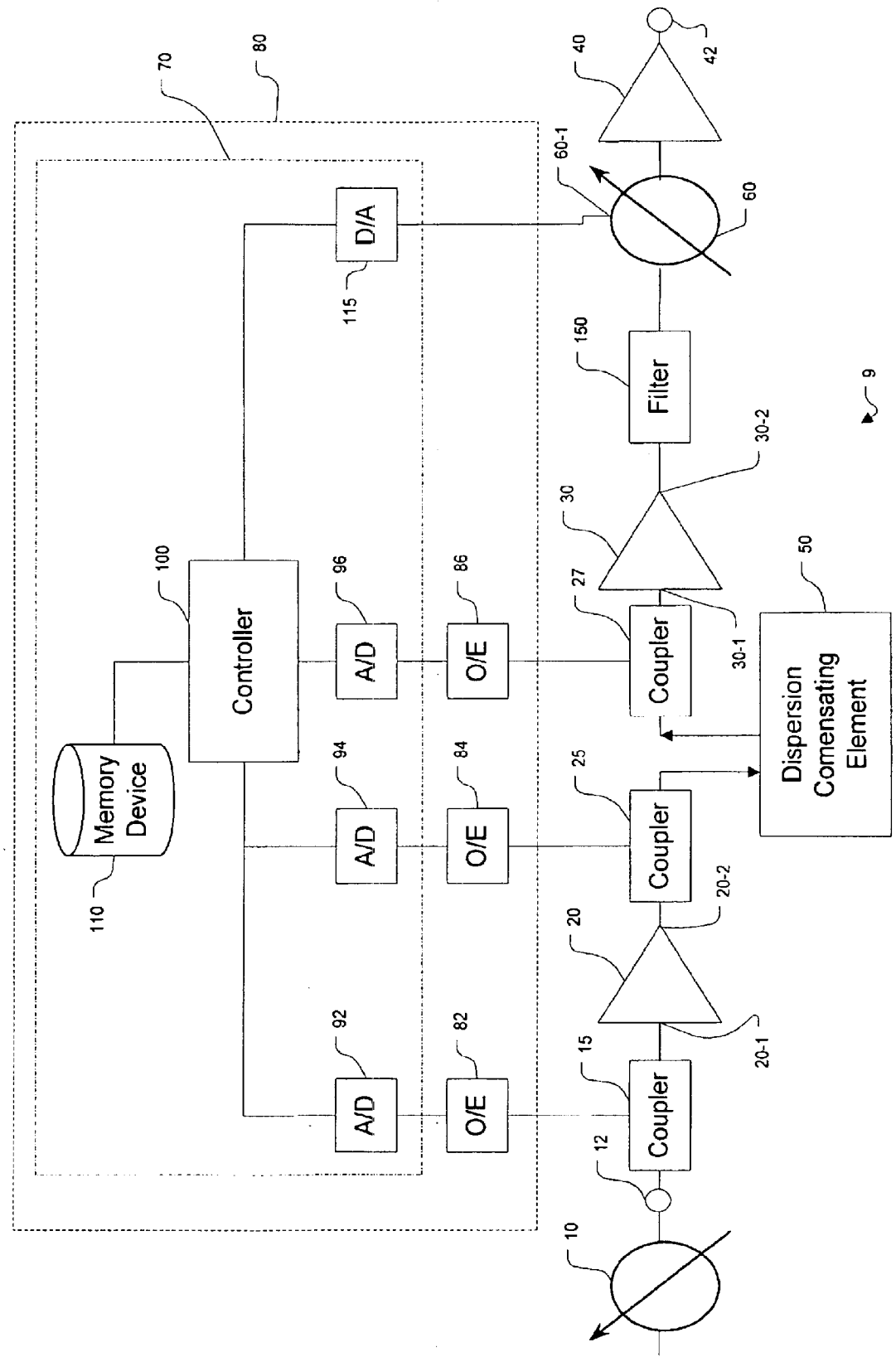
FIG. 6 illustrates an optical amplifier in accordance with a sixth embodiment of the present invention.

FIG. 6 illustrates optical amplifier 9 in accordance with another alternative embodiment of the present invention. Optical amplifier 9 of FIG. 5 is similar to optical amplifier 5 of FIG. 1 but adds filter 150 between the second stage amp 30 and the third stage amp 40. An optical isolator (not shown) may also be used between the filter 150 and the second stage amp 30 to improve performance. Filter 150 may be constructed from a commercially available filter(s) (e.g. from JDS Fitel).

Filter 150 may selectively attenuate certain optical signal wavelengths, e.g., the high gain wavelengths output from second stage amp 30, while permitting other wavelengths to pass substantially unattenuated. In this way, the filter 150 may perform gain flattening.

Figure 8:
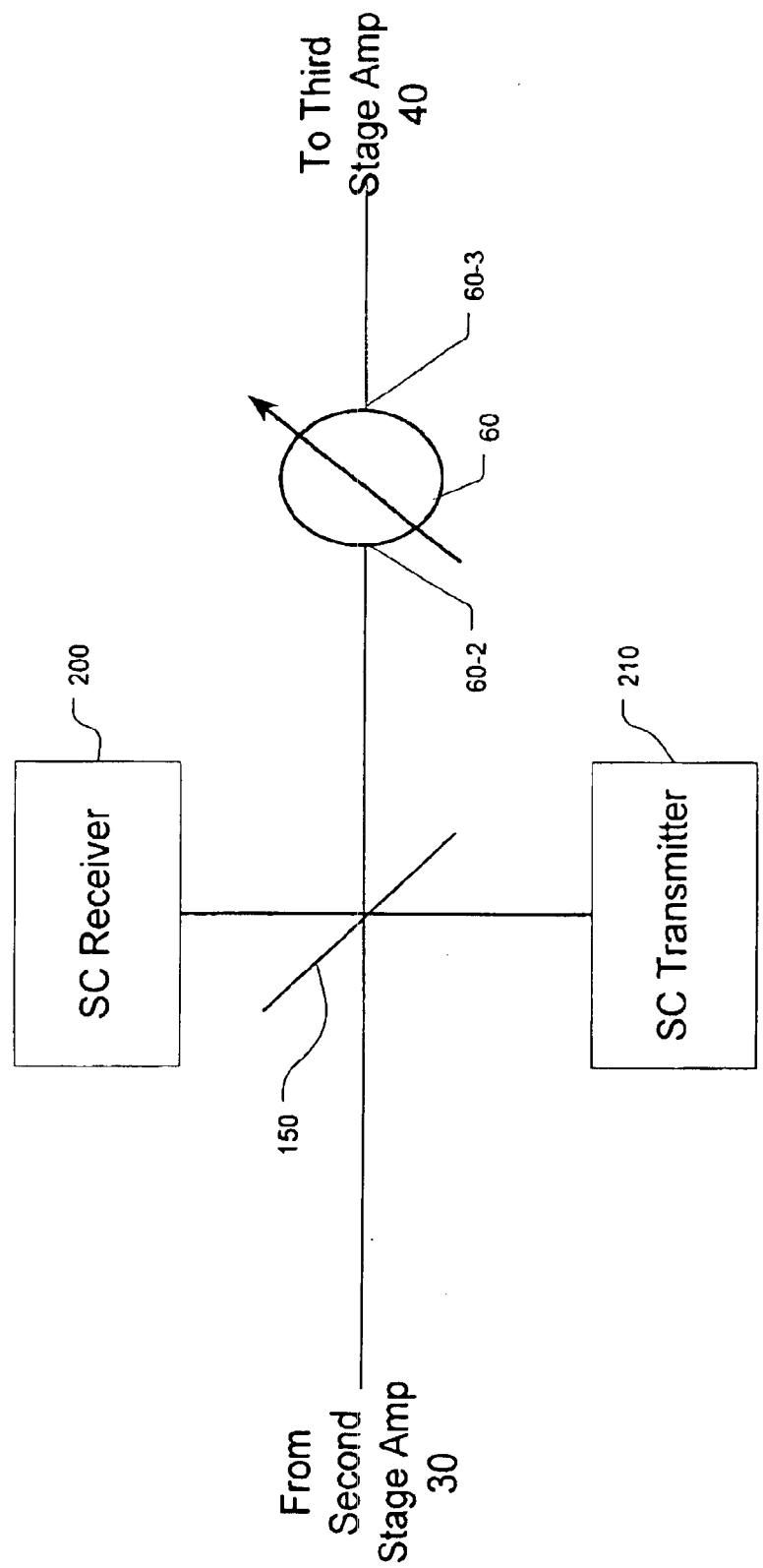
FIG. 8 illustrates a service channel add/drop configuration in accordance with an aspect of the present invention.

FIG. 8 shows an alternative way of using filter 150 other than the gain flattening purpose discussed above. Specifically, filter 150 may be used to inject and remove a service or monitoring channel signal. Such service or monitoring channel signals typically have a wavelength lying outside the range of operating wavelengths (e.g., 1500 nm–1590 nm) of optical signals applied to input port 12. These service channel wavelength(s) can be inserted and extracted from amplifiers 1,5,6,7,8,9 or 9', as discussed, for example, in U.S. Pat. No. 5,532,864, incorporated by reference herein.

As further shown in FIG. 8, filter 150 may reflect the received service channel signals, typically having a wavelength of 1625–1650 nm, to service channel (SC) receiver 200, and directs the service channel signal emitted by service channel (SC) transmitter 210 to input port 60-2 of attenuator 60. The service channel add/drop configuration shown in FIG. 8 can also be incorporated into any of the amplifiers 1, 5, 6, 7, or 8 shown in FIGS. 1, 2, 3, 4, and 5.

It is noted that filter 150 can serve both purposes of adding dropping the service channel, as well as selectively attenuating the high gain wavelength i.e., for gain flattening. Alternatively, separate filters 150 can be provided for service channel add/drop and gain flattening, respectively.

Figure 7:
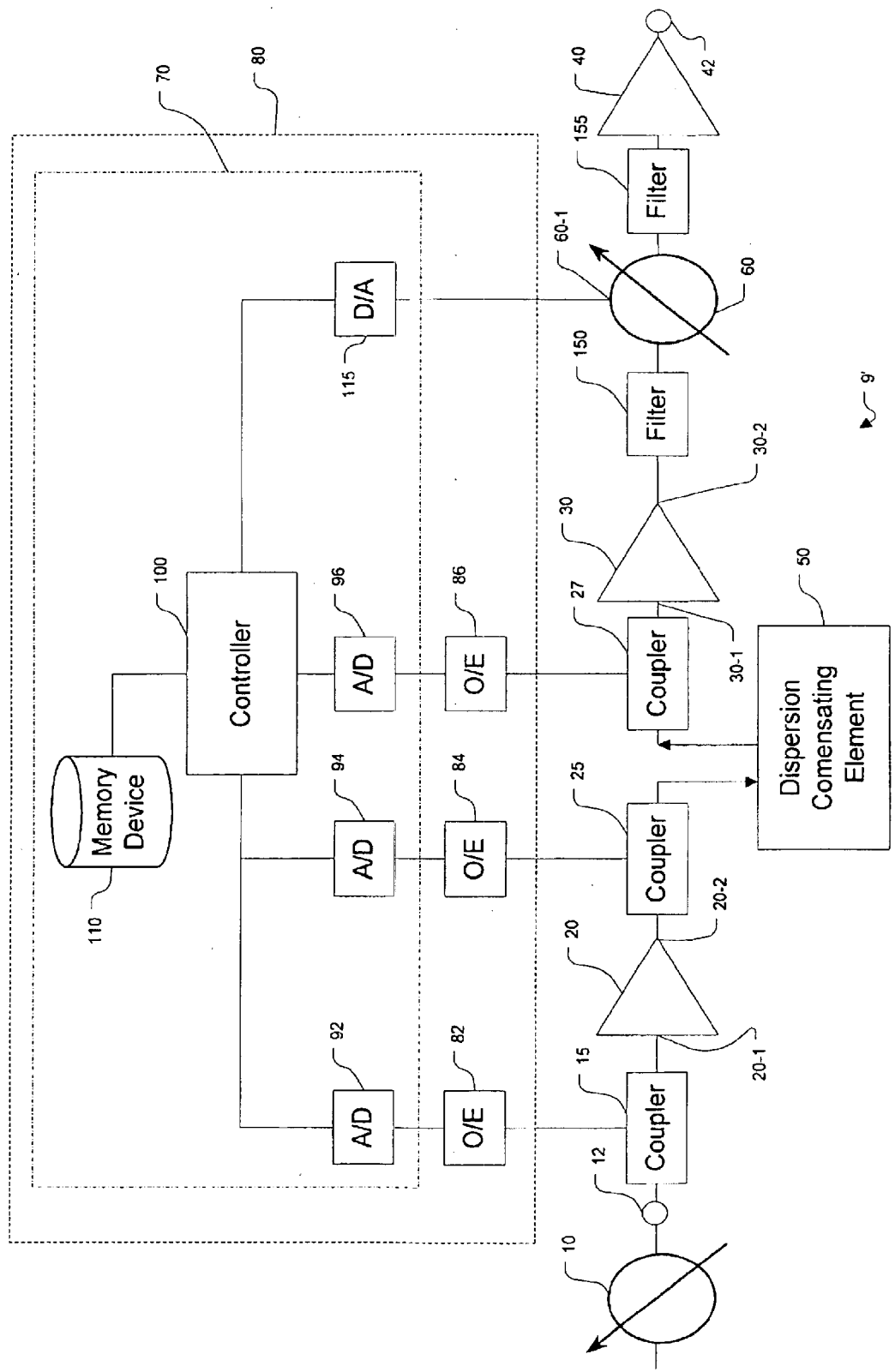
FIG. 7 illustrates an optical amplifier in accordance with a seventh embodiment of the present invention.

FIG. 7 illustrates amplifier 9' in accordance with a further embodiment of the present invention. Amplifier 9' is similar to amplifier 9 discussed above in relation to FIG. 6, but includes an additional filter 155. In this embodiment, filter 150 typically attenuates one group of wavelengths, while filter 155 attenuates another group in order to provide gain flattening.

Figure 9:
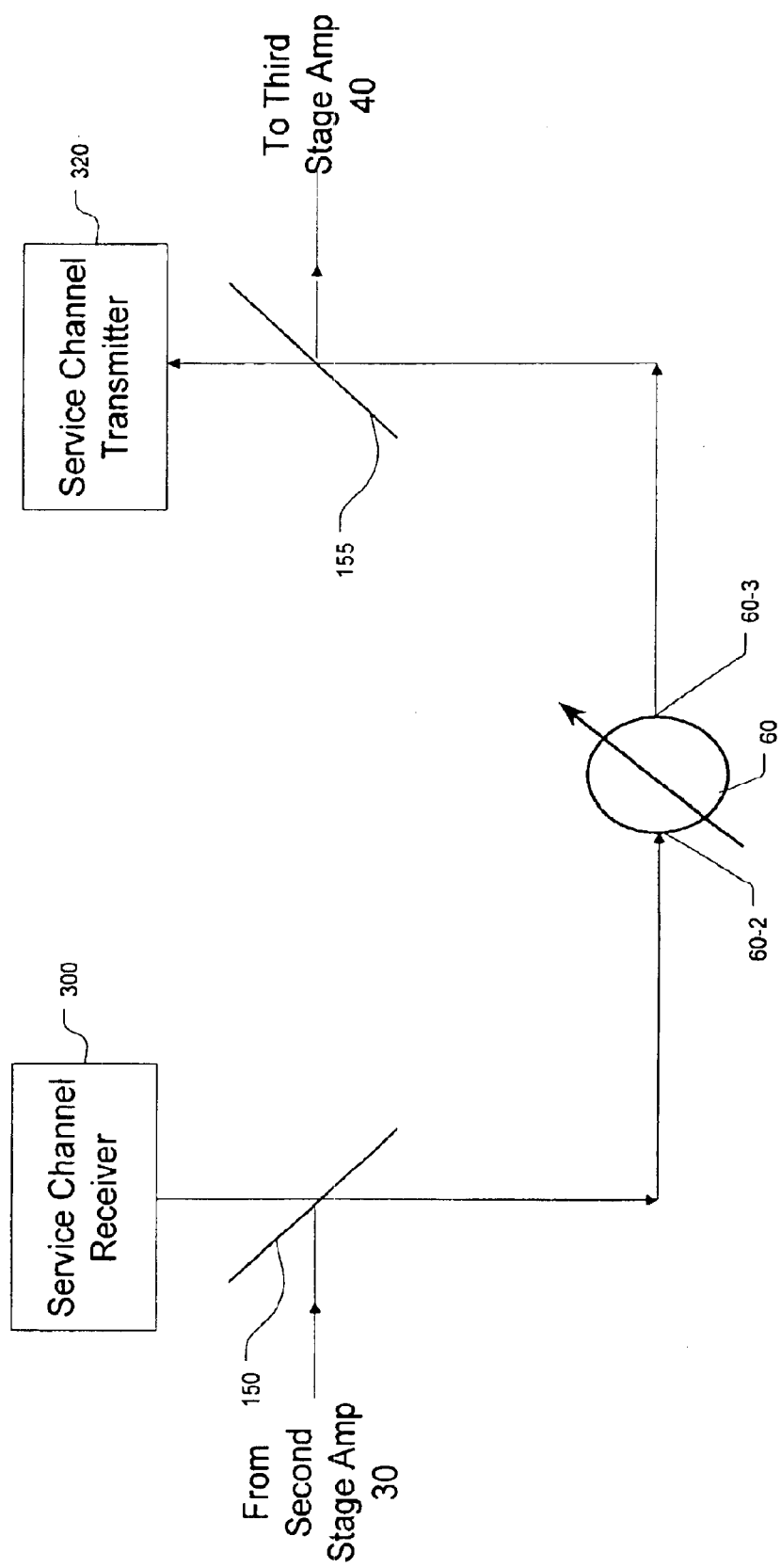
FIG. 9 illustrates an additional service channel add/drop configuration in accordance with an aspect of the present invention.

Alternatively, as further shown in FIG. 9, filter 150 can be used to direct first service channel signals to service channel receiver 300, while filter 155 can be used to couple second service channel signals emitted by service channel transmitter 320 to the third amp stage 40 for output from amplifier 9'. Additional filter(s) can also be provided in FIG. 9 to provide spectral filtering of the high gain wavelengths to obtain flattened gain in the manner discussed above. Alternatively, filters 150 and 155 can be provided which both selectively attenuate the high gain wavelengths and perform the service channel add or drop.

The embodiment shown in FIG. 9 may be advantageous in having reduced cross-talk between the added and dropped service channel signals compared to the add/drop configuration shown in FIG. 8. In particular, the add/drop configuration shown in FIG. 8 includes a single filter 150 for both adding and dropping the service channel signals. Typically, filter 150, however, is not entirely reflective at the service channel wavelength. Accordingly, a portion of the second service channel signals emitted by service channel transmitter 210 in FIG. 8 can pass through filter 150 to service channel receiver 200, thereby resulting in cross-talk or interference between the received service channel signal and the portion of the service channel signal emitted by service channel transmitter 210.

In FIG. 9, the service channel signals are dropped and added with separate filters 150, 155. Accordingly, any portion of the service channel signals emitted by service channel transmitter 320 that propagates toward attenuator 60, and not to second stage amp 30, as intended, are significantly attenuated by attenuator 60, thereby effectively eliminating any cross-talk at receiver 300. The add/drop configuration shown in FIG. 9 may be incorporated into all the amplifiers discussed above.

Figure 10:
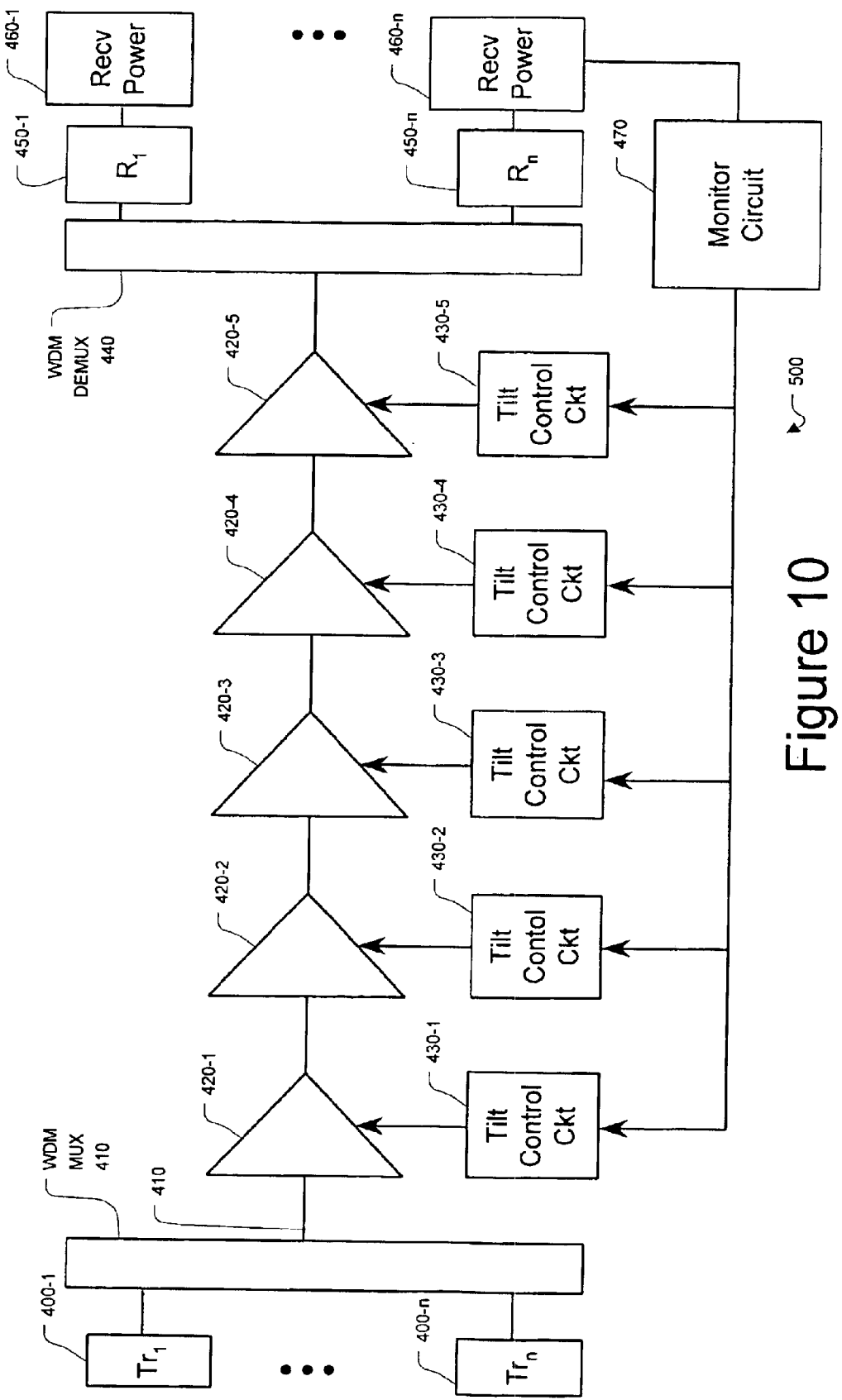
FIG. 10 illustrates a block level diagram of an optical communication system in accordance with the present invention.

FIG. 10 illustrates an alternative embodiment of the present invention in which the attenuators included in a chain of amplifiers are adjusted substantially simultaneously so that the power associated with each optical signal output from the chain is substantially the same.

In particular, FIG. 10 illustrates a WDM system 500 including a plurality of transmitters $Tr_1$, to $Tr_n$, (400-1 to 400-n) each of which emits one of a plurality of optical signals. Each of the plurality of optical signals are at a respective one of a plurality of wavelengths. The optical signals are output to and combined, using a conventional WDM multiplexer 410, onto an optical communication path 410, comprising, for example, an optical fiber. A chain of optical amplifiers 420-1 to 420-5 are coupled in series along optical communication path 410. Each of the optical amplifiers (420-1 to 420-5) may have a structure similar to that of any one of optical amplifiers (1,5,6,7,8,9, or 9') discussed above, including an optical attenuator 60 coupled between second and third stage amps 30, 40.

A WDM demultiplexer 440 is coupled to optical communication path 410 at the end of the amplifier chain. Each of the outputs of WDM demultiplexer 410 are coupled to a respective one of receivers 450-1 to 450-n, which convert the optical signals to corresponding electrical signals. Received power modules 460-1 to 460-n sense these electrical signals and determine the received optical power and/or signal to noise ratio associated with each optical signal. The received power modules 460-1 to 460-n supply power level signals corresponding to the received optical powers to monitor circuit 470, which determines whether the received power levels are substantially equal. If not, monitor circuit 470 outputs an adjustment signal to tilt control circuits 430-1 to 430-5.

In response to the adjustment signal, each of tilt control circuits 430-1 to 430-5 outputs a corresponding attenuation control signal to the attenuators in amplifiers 420-1 to 420-5, thereby adjusting the output powers of the optical signals supplied from each of these amplifiers. Received power modules, in turn, detect the new optical power levels and supply new power level signals to monitor circuit 470. Monitor circuit 470 typically continues to output adjustment signals to tilt control circuits 430-1 to 430-5, thereby maintaining substantially equal power levels for each optical signal.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical amplification device, comprising:

a first segment of active optical fiber having a first end portion coupled to an optical communication path carrying a plurality of optical signals, each at a respective one of a plurality of wavelengths, and a second end portion, said first segment of active optical fiber receiving the plurality of optical signals through the first end portion and outputting the plurality of optical signals through the second end portion;

a dispersion compensating element optically coupled to the second end portion of said first segment of active optical fiber;

a second segment of active optical fiber having a first end portion coupled to said dispersion compensating element and carrying a plurality of dispersion compensated optical signals, each at a respective one of a plurality of wavelengths, and a second end portion, said second segment of active optical fiber receiving the plurality of optical signals through the first end portion and outputting the plurality of dispersion compensated optical signals through the second end portion;

a variable optical attenuator having an input port coupled to the second end portion of said second segment of optical fiber, said variable optical attenuator having a control port that receives an attenuation control signal and an output port, said input port of said variable optical attenuator receiving the plurality of dispersion compensated optical signals;

a third segment of active optical fiber having a first end portion coupled to the output port of said variable optical attenuator and a second end portion, the plurality of dispersion compensated optical signals propagating through said variable optical attenuator and being supplied to the first end portion of said third segment of active optical fiber via the output port of said variable optical attenuator, the plurality of dispersion compensated optical signals being output from said third segment of active optical fiber via the second end portion of said third segment of active optical fiber; and a control circuit operatively coupled to the optical communication path, said control circuit sensing an input optical power of at least one of the plurality of optical signals input to the first end of said first segment of active optical fiber said variable optical attenuator attenuating the plurality of optical signals in response to the attenuation control signal such that a gain profile of the plurality of dispersion compensated optical signals output from the second end portion of said third segment of active optical fiber is flattened, said control circuit including an attenuator offset value storage device operatively connected to said control circuit, said attenuator offset value storage device storing an attenuator offset value, wherein said attenuator offset value substantially minimizes non-flatness of an output spectrum output from the optical amplification device;

said control circuit inputting the attenuator offset value from said attenuator offset value storage device and outputting the attenuation control signal in response to the input optical power and the attenuator offset value.

2. The optical amplification device in accordance with claim 1, said control circuit including:

a photodetector operatively coupled to the first end portion of said first segment of active optical fiber, said photodetector sensing the input optical power of at least one of the plurality of optical signals input to the first end of said first segment of active optical fiber and outputting an electrical signal in response thereto;

a memory device storing a dispersion compensating element loss value representative of a power loss across said dispersion compensating element;

a processing unit operatively coupled to said photodetector and to said memory device, said processing unit receiving the electrical signal from said photodetector and the dispersion compensating element loss value from said memory device; said processing unit outputting the attenuation control signal in response to the electrical signal, the attenuator offset value, and the dispersion compensating element loss value.

3. The optical amplification device in accordance with claim 1, said control circuit including:

a first photodetector operatively coupled to the first end portion of said first segment of active optical fiber, said photodetector sensing the input optical power of at least one of the plurality of optical signals input to the first end of said first segment of active optical fiber and outputting an electrical signal in response thereto;

a second photodetector operatively coupled to an input port of said dispersion compensating element, said second photodetector sensing an optical input power associated with the plurality of optical signals input to said dispersion compensating element and outputting a second electrical signal in response thereto;

a third photodetector operatively coupled to an output port of said dispersion compensating element, said third photodetector sensing an optical output power associated with the plurality of dispersion compensated optical signals output from said dispersion compensating element and outputting a third electrical signal in response thereto;

a memory device storing a reference span loss value indicative of a span loss associated with a preceding span to which said first segment of active optical fiber is operatively connected and a reference dispersion compensating element loss value representative of a reference power loss across said dispersion compensating element;

a processing unit operatively coupled to said first, second and third photodetectors and to said memory device, said processing unit receiving the first, second and third electrical signals from said first, second, and third photodetectors and the reference span loss and dispersion compensating element loss values from said memory device; said processing unit outputting the attenuation control signal in response to the first electrical signal, the second electrical signal, the third electrical signal, the reference span loss value, the attenuator offset value, and a dispersion compensating element loss value.

4. The optical amplification device in accordance with claim 1, said control circuit including:

a first photodetector operatively coupled to the first end portion of said first segment of active optical fiber, said photodetector sensing the input optical power of at least one of the plurality of optical signals input to the first end of said first segment of active optical fiber and outputting an electrical signal in response thereto;

a second photodetector operatively coupled to an input port of said variable optical attenuator, said second photodetector sensing an optical input power associated with the plurality of optical signals input to said dispersion compensating element and outputting a second electrical signal in response thereto;

a third photodetector operatively coupled to an output port of said dispersion compensating element, said third photodetector sensing an optical output power associated with the plurality of dispersion compensated optical signals output from said dispersion compensating element and outputting a third electrical signal in response thereto;

a comparator operatively connected to said second and third photodetectors and receiving the second and third electrical signals, said comparator comparing the second and third electrical signals and generating a dispersion compensating element loss value in response thereto;

a memory device storing a reference span loss value indicative of a span loss associated with a preceding span to which said first segment of active optical fiber is operatively connected and a reference dispersion compensating element power loss value representative of a power loss across said dispersion compensating element;

a processing unit operatively coupled to said first photodetector, said comparator, and said memory device, said processing unit receiving the first electrical signal from said first photodetector; the dispersion element power loss value from said comparator; and the reference span and dispersion element power loss values from said memory device; said processing unit outputting the attenuation control signal in response to the first electrical signal, the dispersion element power loss value; the reference span power loss value, the attenuator offset value, and the dispersion element power loss value.

5. The optical amplification device in accordance with claim 1, said control circuit including:
   a first photodetector operatively coupled to the first end portion of said first segment of active optical fiber, said photodetector sensing the input optical power of at least one of the plurality of optical signals input to the first end of said first segment of active optical fiber and outputting an electrical signal in response thereto;
   a second photodetector operatively coupled to an input port of said variable optical attenuator, said second photodetector sensing an optical input power associated with the plurality of optical signals input to said dispersion compensating element and outputting a second electrical signal in response thereto;
   a third photodetector operatively coupled to an output port of said dispersion compensating element, said third photodetector sensing an optical output power associated with the plurality of dispersion compensated optical signals output from said dispersion compensating element and outputting a third electrical signal in response thereto;
   a dispersion compensating element loss error calculator operatively connected to said second and third photodetectors and receiving the second and third electrical signals, said dispersion compensating element loss error calculator calculating a dispersion compensating element loss error based on the second and third electrical signals and a reference dispersion compensating element loss value;
   a span loss error calculator operatively connected to said first photodetector and receiving the first electrical signal, said span loss error calculator calculating a span loss error based on the first electrical signal and a reference span loss value;
   a processing unit operatively coupled to said dispersion compensating element loss error calculator and said span loss error calculator, said processing unit receiving the dispersion compensating element loss error and the span loss error; said processing unit outputting the attenuation control signal in response to the dispersion compensating element loss error, the attenuator offset value, and the span loss error.

6. The optical amplification device in accordance with claim 1, further comprising:
   an optical filter having an input port coupled to the second end portion of said second segment of active optical fiber and an output port coupled to the input port of said variable optical attenuator.

7. The optical amplification device in accordance with claim 6, wherein said optical filter is a gain flattening filter.

8. The optical amplification device in accordance with claim 6, wherein said optical filter includes an additional input port and an additional output port, said optical amplification device further comprising:
   a service channel transmitter coupled to the additional input port of said optical filter, said service channel transmitter supplying first optical service signals at a wavelength different than the plurality of optical signals to the additional input port of said optical filter, the first optical service signals being output through the output port of said optical filter to the input port of said variable optical attenuator; and
   a service channel receiver coupled to the additional output port of said optical filter, said service channel receiver sensing second optical service signals output from the additional output port of said optical filter.

9. The optical amplification device in accordance with claim 1, further comprising:
   a first optical filter having an input port coupled to the second end portion of said second segment of active optical fiber and an output port coupled to the input port of said variable optical attenuator; and
   a second optical filter having an input port coupled to the output port of said variable optical attenuator and an output port coupled to the first end portion of said third segment of active optical fiber.

10. The optical amplification device in accordance with claim 9, wherein said first and second optical filters are gain flattening filters.

11. The optical amplification device in accordance with claim 9, wherein said first optical filter includes an additional output port and said second optical filter includes an additional input port, said optical amplification device further comprising:
   a service channel receiver coupled to the additional output port of said first optical filter, said service channel receiver sensing first optical service signals output from the additional output port of said first optical filter, the first optical service signals being at a wavelength different than the plurality of optical signals; and
   a service channel transmitter coupled to the additional input port of said second optical filter, the first optical service signals being output through the output port of said second optical filter to the first end portion of said third segment of active optical fiber.

12. The optical amplification device in accordance with claim 1, wherein said dispersion compensating element includes dispersion compensating fiber.

13. The optical amplification device in accordance with claim 1, wherein said dispersion compensating element includes a dispersion compensating Bragg grating.

14. The optical amplification device in accordance with claim 1, wherein said first segment of active optical fiber and said second segment of active optical fiber provide high gain and a low noise figure relative to said third segment of active optical fiber which is pumped to provide a high optical conversion efficiency relative to said first and second segments of active optical fiber.

15. The optical amplification device in accordance with claim 1, further comprising:
   a first pump optically coupled to said first segment of active optical fiber, said first pump operating at 980 nm;
   a second pump optically coupled to said second segment of active optical fiber, said first pump operating at 980 nm;
   a third pump optically coupled to said third segment of active optical fiber, said first pump operating at 1480 nm and providing copropagating pumping light; and
   a fourth pump optically coupled to said third segment of active optical fiber, said first pump operating at 1480 nm and providing counterpropagating pumping light.

16. The optical amplification device in accordance with claim 15,
   said first and second pumps providing high gain and a low noise figure to said first and second segments of active optical fiber relative to said third segment of active optical fiber; and said third and fourth pumps providing a high optical conversion efficiency to said third segment of active optical fiber relative to said first and second segments of active optical fiber.

17. An optical communication apparatus, comprising:

a plurality of optical transmitters, each emitting a corresponding one of the plurality of optical signals, each of the plurality of optical signals being at a respective one of a plurality of wavelengths;

an optical combiner having a plurality of inputs, each of which being coupled to a respective one of said plurality of optical transmitters, and an output supplying the plurality of optical signals to a first end portion of an optical communication path;

a plurality of optical amplification devices according to claim 1, said optical amplification devices arranged in series along the optical communication path;

an optical demultiplexer having an input configured to be coupled to a second end portion of the optical communication path, and a plurality of outputs, each of the plurality of outputs of said optical demultiplexer supplying a respective one of the plurality of optical signals;

a plurality of optical receivers, each of which being coupled to a respective one of the plurality of outputs of said optical demultiplexer;

a plurality of received power modules, each of which being coupled to a respective one of said plurality of receivers, each of said plurality of received power modules outputting a respective one of a plurality of power level signals indicative an optical power received at each of said plurality of receivers;

a monitoring circuit coupled to each of said plurality of received power modules, said monitoring circuit receiving the plurality of power level signals and outputting an adjustment signal in response to the plurality of power level signals; and a plurality of tilt control circuits coupled to each of said plurality of optical amplification devices, each of said plurality of tilt control circuits receiving the adjustment signal from said monitor circuit, said tilt control circuits adjusting a gain tilt associated with each of said optical amplification devices in response to the adjustment signal.

18. A method of controlling an optical amplification device having a first, second and third amplification stages and connected to a span having a span loss that may vary, comprising:

a first amplifying step amplifying a plurality of optical signals each at a respective one of a plurality of wavelengths with the first amplification stage;

dispersion compensating the plurality of optical signals output from the first amplification stage;

a second amplifying step amplifying the plurality of dispersion compensated optical signals with the second amplification stage;

optically attenuating the dispersion compensated optical signals output from the second amplification stage;

a third amplifying step amplifying the optically attenuated signals with the third amplification stage;

sensing an input optical power of at least one of the plurality of optical signals input to the first amplification stage;

said optically attenuating step optically attenuating the plurality of dispersion compensated optical signals such that a gain profile of the plurality of dispersion compensated optical signals output from the third amplification stage is flattened;

storing an attenuator offset value; and controlling said optically attenuating step to optically attenuate the dispersion compensated optical signals output from the second amplification stage according to the input optical power sensed by said sensing step, and the attenuator offset value stored by said storing step, wherein said attenuator offset value substantially minimizes non-flatness of an output spectrum output from the optical amplification device.

19. The method of controlling an optical amplification device in accordance with claim 18 further comprising:

storing a dispersion compensating element loss value representative of a power loss resulting from said dispersion compensating step; and said controlling step controlling said optically attenuating step to optically attenuate the dispersion compensated optical signals output from the second amplification stage according to the input optical power sensed by said sensing step, the dispersion compensating element loss value, and the attenuator offset value stored by said storing step.

20. The method of controlling an optical amplification device in accordance with claim 18, further comprising:

sensing a dispersion compensating element loss value representative of a power loss resulting from said dispersion compensating step; and said controlling step controlling said optically attenuating step to optically attenuate the dispersion compensated optical signals output from the second amplification stage according to the input optical power sensed by said sensing step, the dispersion compensating element loss value, and the attenuator offset value stored by said storing step.

21. The method of controlling an optical amplification device in accordance with claim 18, further comprising:

filtering the plurality of signals between the second and third amplification stages with a gain flattening filter.

22. The method of controlling an optical amplification device in accordance with claim 18, further comprising:

providing a high gain and a low noise figure with the first and second amplification stages relative to the third amplification stage;

provide a high optical conversion efficiency with the third amplification stage relative to the first and second amplification stages.

23. An optical amplifier for a wavelength division multiplexed communication system carrying a wavelength division multiplexed signal in an optical transmission line, comprising:

a first optical amplifier stage having an input optically coupled to the optical transmission line, said first optical amplifier stage receiving and amplifying the wavelength division multiplexed signal;

a dispersion compensating element optically coupled to an output of said first optical amplifier stage;

a second optical amplifier stage having an input optically coupled to an output of said dispersion compensating element, said second optical amplifier stage receiving and further amplifying the amplified and dispersion compensated wavelength division multiplexed signal;

a variable optical attenuator optically coupled to an output of said second optical amplifier stage, said variable optical attenuator having a control port that receives an attenuation control signal, said variable optical attenuator attenuating the amplified, dispersion compensated signal from said second optical amplifier stage according to the attenuation control signal;

a third optical amplifier stage having an input optically coupled to an output of said variable optical attenuator, said third optical amplifier stage receiving and further amplifying the signal from said variable optical attenuator and outputting the resulting signal to the optical transmission line; and a controller operatively coupled to the optical transmission line and to said variable optical attenuator, said controller outputting the attenuation control signal to said variable optical attenuator;

said variable optical attenuator attenuating the amplified, dispersion compensated signal from said second optical amplifier stage according to the attenuation control signal such that a gain profile of the wavelength division multiplexed signal output from the third optical amplifier stage is substantially flattened, said controller further including:

a photodetector optically coupled to the input of said first optical amplifier stage, said photodetector sensing the input optical power the wavelength division multiplexed signal input to said first optical amplifier stage and outputting an electrical signal in response thereto; and a processing unit operatively coupled to, said photodetector and to said memory device, said processing unit receiving an attenuator offset value, wherein said attenuator offset value substantially minimizes non-flatness of an output spectrum output from the optical amplifier and the electrical signal from said photodetector and the dispersion compensating element loss value from said memory device;

said processing unit outputting the attenuation control signal in response to the attenuator offset value and the electrical signal, wherein said first and said second optical amplifier stages provide high gain and a low noise figure relative to said third optical amplifier stage, and wherein said third optical amplifier stage provides a high optical conversion efficiency relative to said first and second optical amplifier stages.

24. The optical amplifier according to claim 23, further comprising:

a memory device storing a dispersion compensating element loss value representative of a power loss across said dispersion compensating element;

said processing unit outputting the attenuation control signal in response to the attenuator offset value, the electrical signal, and the dispersion compensating element loss value.

* * * * *